United States Patent
Fukui

(10) Patent No.: US 9,557,464 B2
(45) Date of Patent: Jan. 31, 2017

(54) LIGHTING DEVICE FOR VEHICLE

(71) Applicant: TOYODA GOSEI CO., LTD., Kiyosu-shi, Aichi-ken (JP)

(72) Inventor: Hirotaka Fukui, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/737,925

(22) Filed: Jun. 12, 2015

(65) Prior Publication Data
US 2015/0369442 A1  Dec. 24, 2015

(30) Foreign Application Priority Data

Jun. 18, 2014  (JP) .................... 2014-125122

(51) Int. Cl.
*F21S 8/10* (2006.01)
*B60Q 1/28* (2006.01)
*F21V 8/00* (2006.01)

(52) U.S. Cl.
CPC ............ *G02B 6/0006* (2013.01); *F21S 48/211* (2013.01); *F21S 48/215* (2013.01); *F21S 48/2237* (2013.01); *F21S 48/2287* (2013.01)

(58) Field of Classification Search
None
See application file for complete search history.

(56) References Cited

U.S. PATENT DOCUMENTS

| 4,345,818 A | * | 8/1982 | Blum | A01G 9/243 |
| | | | | 359/592 |
| 5,436,805 A | * | 7/1995 | Hsu | G02B 6/0006 |
| | | | | 362/294 |
| 2009/0201696 A1 | | 8/2009 | Kamikatano et al. | |
| 2011/0063872 A1 | | 3/2011 | Irie | |

FOREIGN PATENT DOCUMENTS

| JP | 4463246 B2 | 5/2010 |
| JP | 5341391 B2 | 11/2013 |

* cited by examiner

*Primary Examiner* — Ashok Patel
(74) *Attorney, Agent, or Firm* — Posz Law Group, PLC

(57) ABSTRACT

A lighting device for a vehicle includes: a transparent rod shaped light guide member having an incident surface of lights in an end face; a light source which is arranged so as to be opposed to the incident surface of the rod shaped light guide member and generates heat at a temperature or higher than a softening point of the rod shaped light guide member, lights emitted from the light source being allowed to be incident on the rod shaped light guide member from the incident surface so that the rod shaped light guide member emits lights in a linear form; and a transparent heat insulating part arranged between the light source and the incident surface of the rod shaped light guide member.

12 Claims, 4 Drawing Sheets

PRIOR ART

LIGHTING DEVICE FOR VEHICLE

CROSS-REFERENCE TO RELATED APPLICATION(S)

This application is based upon and claims the benefit of priority from Japanese Patent Application No. 2014-125122, filed on Jun. 18, 2014, the entire contents of which are incorporated herein by reference.

BACKGROUND

1. Field of the Invention

The present invention relates to a lighting device for a vehicle having a rod shaped light guide member which emits lights in a linear form.

2. Description of the Related Art

As a lighting device for a vehicle which illuminates an inner part and an outer part of the vehicle, for instance, a lighting device shown in FIG. 4 is known. This lighting device 50 for a vehicle includes a rod shaped light guide member 51, a light source 53 and a guide case 55. The rod shaped light guide member 51 is formed with a transparent resin in the shape of a rod and has an incident surface 52 of lights on an end face. The light source 53 is formed with a semiconductor element such as a light emitting diode (LED) mounted on, for instance, a substrate 54. The light source 53 is arranged under a state that the light source is opposed to the incident surface 52 of the rod shaped guide member 51. The guide case 55 is provided with a tubular holding part 56 having both ends opened. An end part 51a of the rod shaped light guide member 51 is inserted into the holding part 56 so that the end part 51a is positioned. Then, when the light source 53 is turned on, lights emitted from the light source 53 are incident on the rod shaped light guide member 51 through the incident surface 52. When the lights are propagated in the rod shaped light guide member 51, the rod shaped light guide member 51 emits lights in a linear form to illuminate surroundings.

In the lighting device 50 for a vehicle, as the rod shaped light guide member 51 is more distant from the light source 53, a quantity of the lights incident on the rod shaped light guide member 51 through the incident surface 52 of the lights emitted by the light source 53 is more reduced. Accordingly, a light emission efficiency of the rod shaped light guide member 51 is deteriorated. Thus, the light source 53 is preferably allowed to come close to the rod shaped light guide member 51 from a view point of prevention of the light emission efficiency from being deteriorated.

As the above-described rod shaped light guide member 51, are exemplified a rod shaped light guide member formed with a plurality of members and having a layer structure that the plurality of members are laminated on concentric circles and a rod shaped light guide member formed with a single member and having no layer structure.

Further, the latter rod shaped light guide member 51 is roughly divided into two types. As disclosed in Japanese Patent No. 4463246, the rod shaped light guide member 51 as one of the types is provided with a reflection structure formed with a reflection surface such as a groove in an outer part of a molded body of a transparent resin. In the rod shaped light guide member 51 of this type, lights incident from an incident surface are reflected and scattered by the reflection surface of the groove, and accordingly, the lights are outputted from another surface, so that the lights are emitted in a liner form.

As disclosed in Japanese Patent No. 5341391, the rod shaped light guide member 51 of the other type is formed with light scattering particulates which are dispersed. In the rod shaped light guide member 51 of this type, the lights which are allowed to be incident from an incident surface 52 are scattered by the light scattering particulates to emit lights in a linear form.

In recent years, the lighting device 50 for a vehicle having the above-described structure is applied not only to a relatively dark illumination, but also to a lighting device for a vehicle which requires a brightness to illuminate an outer part of the vehicle. Thus, a voltage applied to the light source 53 is increased, so that a quantity of heat generation of the light source 53 is liable to increase. Accordingly, there is a fear that when the light source 53 is allowed to come close to the rod shaped light guide member 51, if heat of the light source 53 is transmitted to the rod shaped light guide member 51 through the incident surface 52, the rod shaped light guide member 51 may possibly undergo a thermal damage depending on a space between them. For instance, in the case of the rod shaped light guide member 51 having no layer structure, the rod shaped light guide member 51 is softened. Further, in the case of the rod shaped light guide member 51 having the layer structure, there is a fear that an interlayer peeling may possibly arise due to heat. In this case, a difference arises in a light scattering property or transparence between a peeling part and other parts than the peeling part.

SUMMARY

The present invention is devised by considering the above-described circumstances, and it is an object of the present invention to provide a lighting device for a vehicle which can restrain a rod shaped light guide member from receiving a thermal damage through an incident surface.

According to an aspect of the invention, there is provided a lighting device for a vehicle including: a transparent rod shaped light guide member having an incident surface of lights in an end face; a light source which is arranged so as to be opposed to the incident surface of the rod shaped light guide member and generates heat at a temperature or higher than a softening point of the rod shaped light guide member, lights emitted from the light source being allowed to be incident on the rod shaped light guide member from the incident surface so that the rod shaped light guide member emits lights in a linear form; and a transparent heat insulating part arranged between the light source and the incident surface of the rod shaped light guide member.

Here, the above-described transparence includes a colored transparence as well as an achromatic transparence.

According to the above-described structure, when the light source emits the lights, the lights partly pass through the heat insulating part. Here, the heat insulating part absorbs not a little of the lights when the lights pass through. However, since the heat insulating part is transparent, a quantity of the lights absorbed by the heat insulating part is small.

The lights which pass through the heat insulating part are incident on the rod shaped light guide member through the incident surface. The lights are propagated in the rod shaped light guide member, so that the rod shaped light guide member emits the lights in a linear form.

When the light source emits the lights, a heat is generated. The light source generates the heat at a temperature of a softening point or higher of the rod shaped light guide member. However, the heat of the light source is interrupted by the heat insulating part arranged between the light source and the rod shaped light guide member. Accordingly, the heat transmitted to the rod shaped light guide member is smaller than that when the heat is directly transmitted to the rod shaped light guide member through air without providing the heat insulating part. Accordingly, the temperature of the rod shaped light guide member is hardly become the softening point of itself or higher. Thus, a phenomenon that the rod shaped light guide member receives a thermal damage through the incident surface is suppressed.

Further, since the thermal damage of the rod shaped light guide member is suppressed as described above, the light source can be allowed to come close to the rod shaped light guide member. When the light source comes close to the rod shaped light guide member, a quantity of lights of the lights emitted by the light source which are not incident on the rod shaped light guide member from the incident surface and leak is reduced. Thus, a light emission efficiency of the rod shaped light guide member is restrained from being deteriorated.

In the lighting device for a vehicle, the heat insulating part is preferably formed with a material having the softening point higher than the softening point of the rod shaped light guide member.

According to the above-described structure, since the heat insulating part is used which is formed with the material whose softening point is higher than that of the rod shaped light guide member, the heat insulating part exhibits a heat resistance higher than that when the heat insulating part is formed with the same material as that of the rod shaped light guide member.

In the lighting device for a vehicle, the heat insulating part is preferably formed with the material which has the softening point of the temperature or higher to which the heat of the light source is transmitted through the air.

According to the above-described structure, since the heat of the light source is transmitted to the heat insulating part through the air, the temperature of the heat insulating part is lower than the temperature of the light source and hardly becomes the softening point or higher of the heat insulating part. Accordingly, the heat insulating part effectively exhibits an adiabatic effect.

In the lighting device for a vehicle, further, a holding part is provided which holds an end part including the incident surface of the rod shaped light guide member in a positioned state, and the heat insulating part is preferably provided integrally with the holding part.

When the holding part which holds the end part including the incident surface of the rod shaped light guide member in the positioned state is provided in the lighting device for a vehicle, the heat insulating part may be provided integrally with the holding part as in the above-described structure. In such a way, when the holding part is formed, the heat insulating part may be formed together therewith.

According to the lighting device for a vehicle, the rod shaped light guide member can be restrained from receiving a thermal damage through the incident surface.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
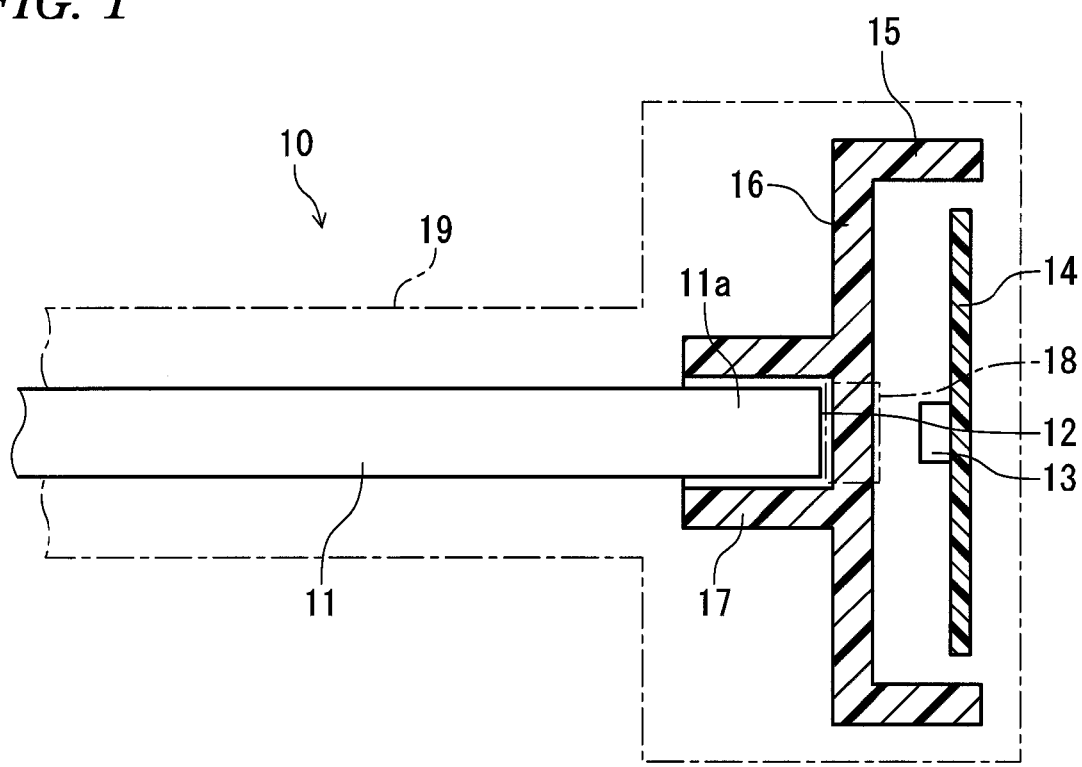
FIG. 1 is a partly sectional view showing one exemplary embodiment of a lighting device for a vehicle.

Now, one exemplary embodiment of a lighting device for a vehicle will be described below by referring to FIG. 1.

The lighting device 10 for a vehicle serves to illuminate an inner part and an outer part of the vehicle and is applied to, for instance, an accessory lamp which emits lights in an edge part of a front grille of a front surface of the vehicle. The lighting device 10 for a vehicle includes a rod shaped light guide member 11, a light source 13, a substrate 14, a guide case 15 and a heat insulating part 18.

The rod shaped light guide member 11 is formed in the shape of a rod with a transparent resin material, herein, PMMA (polymethyl methacrylate) as one form of an acrylic resin. A sectional form of the rod shaped light guide member 11 is circular herein, however, may be rectangular. The rod shaped light guide member 11 has an incident surface 12 of lights in an end face.

As the rod shaped light guide member 11, may be used any of rod shaped light guide members in which the lights incident from the incident surface 12 are propagated to emit the lights in a linear form. Accordingly, as described in the paragraph of the background art, the rod shaped light guide member 11 may be a rod shaped light guide member formed with a plurality of members and having a layer structure that the plurality of members are laminated on concentric circles or a rod shaped light guide member formed with a single member and having no layer structure In the case of the latter, may be adopted either of the types which are described likewise in the paragraph of the background art, namely, the rod shaped light guide member as one type provided with the reflection structure formed with the reflection surface such as the groove in the outer part or the rod shaped light guide member of the other type formed with the light scattering particulates which are dispersed. In addition thereto, as the rod shaped light guide member 11, may be adopted a rod shaped light guide member having a side surface to which a white colored printing is applied or a rod shaped light guide member having a side surface to which an etching or sand-blasting process is similarly applied.

The substrate 14 is arranged in a position close to the incident surface 12 of the rod shaped light guide member 11. On a surface of the substrate 14 located in the rod shaped light guide member 11 side, a light emitting diode (LED) as a semiconductor light source is mounted as the light source 13. On the substrate 14, a print conductor, circuit elements or the like are formed as well as the light source 13. The light source 13 is arranged in a position close to the incident surface 12 under a state that the light source 13 is opposed to the incident surface 12 of the rod shaped light guide member 11. The light source 13 generates heat at a temperature of a softening point (about 100° C.) or higher of the rod shaped light guide member 11 with the emission of lights. A junction temperature of the light source 13 is about 140° C. at maximum.

The guide case 15 includes a base part 16 and a holding part 17. The base part 16 is arranged between the incident surface 12 and the light source 13 in a longitudinal direction of the rod shaped light guide member 11. The holding part 17 has a cylindrical form and protrudes to the rod shaped light guide member 11 side from the base part 16. Then, an end part 11a in a side of the rod shaped light guide member 11 having the incident surface 12 is inserted into the holding part 17, so that the end part 11a of the rod shaped light guide member 11 is held to be positioned in such a way that an optical axis of the rod shaped light guide member 11 in the incident surface 12 corresponds to an optical axis of the light source 13.

Figure 4:
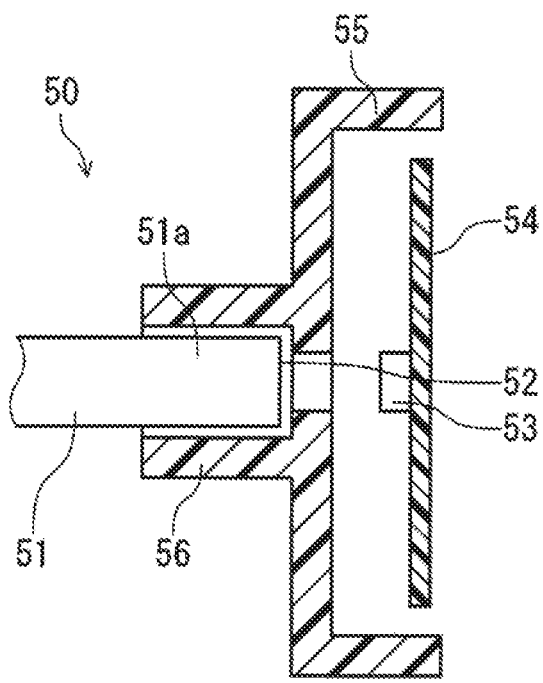
FIG. 4 is a partly sectional view of a usual lighting device for a vehicle.

The heat insulating part 18 is arranged between the light source 13 and the incident surface 12 of the rod shaped light guide member 11 and formed integrally with the holding part 17 (the guide case 15). Namely, the holding part 56 in the usual lighting device 50 for a vehicle shown in FIG. 4 has a structure that both the ends in the longitudinal direction of the rod shaped light guide member 51 are opened. However, in the present exemplary embodiment, since the heat insulating part 18 is provided, the holding part 17 has a bottomed tubular form with an opening part of the holding part 17 in the light source 13 side closed.

The guide case 15 and the heat insulating part 18 are formed with a resin material which is transparent, and has a softening point higher than a softening point of the rod shaped light guide member 11 as a temperature to which heat of the light source 13 is transmitted through air, namely, which is lower than the junction temperature through air or higher. In the present exemplary embodiment, as the resin material which satisfies the above-described conditions, PC (polycarbonagte) having the softening point of about 130° C. is used. The heat insulating part 18 is formed together with the guide case 15 when the guide case 15 is formed by an injection molding.

Further, in the present exemplary embodiment, a space between the light source (LED) 13 and the heat insulating part 18, in other words, a thickness of air between both the members 13 and 18 is set to 10 mm. Further, the thickness of the heat insulating part 18 is set to 15 mm.

The rod shaped light guide member 11, the light source 13, the substrate 14, the guide case 15 and the heat insulating part 18 are arranged in a case 19 shown by a two-dot chain line in FIG. 1. The case 19 is provided with an outer case formed with an opaque resin material and an outer lens formed with a transparent resin material. The outer case and the outer lens are mechanically fastened to each other under a state that a waterproof seal material is held by them.

Now, an operation of the lighting device 10 for a vehicle of the present exemplary embodiment which is formed in such a way as described above will be described below.

When the light source 13 is turned on to emit lights, the lights partly pass through the heat insulating part 18. Here, the heat insulating part 18 absorbs not a little of the lights when the lights pass through. However, since the heat insulating part 18 is transparent, a quantity of the lights absorbed by the heat insulating part 18 is small.

The lights which pass through the heat insulating part 18 are incident on the rod shaped light guide member 11 through the incident surface 12. The lights are propagated in the rod shaped light guide member 11, so that the rod shaped light guide member 11 emit the lights in a linear form. The lights pass through the outer lens of the case 19 to illuminate a peripheral part thereof.

When the light source 13 emits the lights, a heat is generated. The light source 13 generates the heat at a temperature or higher than the softening point of the rod shaped light guide member 11. However, the heat of the light source 13 is interrupted by the heat insulating part 18 arranged between the light source 13 and the rod shaped light guide member 11. Accordingly, the heat transmitted to the rod shaped light guide member 11 is smaller than that when the heat is directly transmitted to the rod shaped light guide member 11 through the air without providing the heat insulating part 18 (this corresponds to the usual lighting device for a vehicle shown in FIG. 4). Accordingly, the temperature of the rod shaped light guide member 11 is hardly become the softening point of itself or higher. Thus, a phenomenon that the rod shaped light guide member 11 receives a thermal damage through the incident surface 12 is suppressed.

In the case of the rod shaped light guide member 11 which has no layer structure, a phenomenon that the rod shaped light guide member 11 is softened by the heat is suppressed. In the case of the rod shaped light guide member 11 having the layer structure, a phenomenon that an interlayer peeling occurs due to the heat is suppressed. A difference is restrained from arising in a light scattering property or a transparence between the peeling part and other parts than the peeling part.

Especially, in the rod shaped light guide member 11 having flexibility, when the rod shaped light guide member is bent, a stress is liable to be applied to the incident surface 12 as the end part. When the rod shaped light guide member 11 has the layer structure, the interlayer peeling is more liable to arise due to the stress and the heat. However, when the heat insulating part 18 is provided, the interlayer peeling can be allowed to hardly arise. Thus, even the rod shaped light guide member 11 having the layer structure can be preferably suitably used for the lighting device 10 for a vehicle.

Since the heat insulating part 18 is formed with the material having the softening point higher than the softening point of the rod shaped light guide member 11, the heat insulating part 18 exhibits a heat resistance higher than that when the heat insulating part 18 is formed with the same material as that of the rod shaped light guide member 11.

Further, the heat insulating part 18 is formed with the resin material which has the softening point as the temperature to which the heat of the light source 13 is transmitted through the air, namely, the temperature or higher which is lower than the temperature (the junction temperature) of the light source 13 through the air. Accordingly, even when the heat of the light source 13 is transmitted to the heat insulating part 18, the temperature of the heat insulating part 18 is lower than the temperature (the junction temperature) of the light source 13 and hardly becomes the softening point of the heat insulating part 18 or higher. Accordingly, the heat insulating part 18 effectively exhibits an adiabatic effect.

Further, since the thermal damage is suppressed as described above, the light source 13 can be allowed to come closer to the rod shaped light guide member 11 than in the usual lighting device for a vehicle.

According to the present exemplary embodiment described above in detail, below-described effects are obtained.

(1) In the lighting device 10 for a vehicle including the transparent rod shaped light guide member 11 having the incident surface 12 of lights in the end face and the light source 13 which is arranged so as to be opposed to the incident surface 12 and generates the heat at the temperature or higher than the softening point of the rod shaped light guide member 11, the transparent heat insulating part 18 is arranged between the light source 13 and the incident surface 12.

Accordingly, the temperature of the rod shaped light guide member 11 can be restrained from being the softening point or higher and the rod shaped light guide member 11 can be restrained from receiving the thermal damage through the incident surface 12.

Further, the light source 13 is allowed to come close to the rod shaped light guide member 1, so that a quantity of lights of the lights emitted by the light source 13 which are not incident on the rod shaped light guide member 11 from the incident surface 12 and leak can be reduced to suppress the deterioration of a light emission efficiency of the rod shaped light guide member 11.

As described above, since a simple structure is used that the heat insulating part 18 is provided, counter matters that the light source 13 is allowed to come close to the rod shaped light guide member 11 and the thermal damage of the rod shaped light guide member 11 is reduced can be allowed to stand together.

(2) The heat insulating part 18 is formed with the material (PC) having the softening point higher than that of the rod shaped light guide member 11.

Accordingly, the resistance of the heat insulating part 18 can be more improved than that when the heat insulating apart 18 is formed with the same material (PMMA) as that of the rod shaped light guide member 11. The heat insulating part 18 itself can be restrained from being softened by the heat of the light source 13, the interlayer peeling can be restrained form arising and a quantity of the lights which pass through the heat insulating part 18 and are incident on the incident surface 12 can be restrained from being reduced.

(3) The heat insulating part 18 is formed with the material (PC) having the softening point at the temperature or higher which is obtained by transmitting the heat of the light source 13 through the air.

Accordingly, even when the heat of the light source 13 is transmitted to the heat insulating part 18, the heat insulating part 18 can be restrained from being softened, the interlayer peeling can be retrained from arising, and the heat insulating part 18 can be allowed to satisfactorily exhibit the effect (the adiabatic effect) so as to hardly transmit the heat of the light source 13 to the rod shaped light guide member 11.

(4) In the lighting device 10 for a vehicle further including the holding part 17 which holds the end part 11 a including the incident surface 12 of the rod shaped light guide member 11 to be positioned, the heat insulating part 18 is provided integrally with the holding part 17 (the guide case 15).

Accordingly, the heat insulating part 18 can be formed together with the holding part 17 (the guide case 15) by an injection molding. As a result, an operation for attaching the heat insulating part 18 to the holding part 17 (the guide case 15) is not necessary. Further, since the heat insulating part 18 is added, the number of parts of the lighting device 10 for a vehicle can be restrained from increasing.

The above-described exemplary embodiment can be carried out as a modified example obtained by changing the exemplary embodiment as described below.

Figure 2:
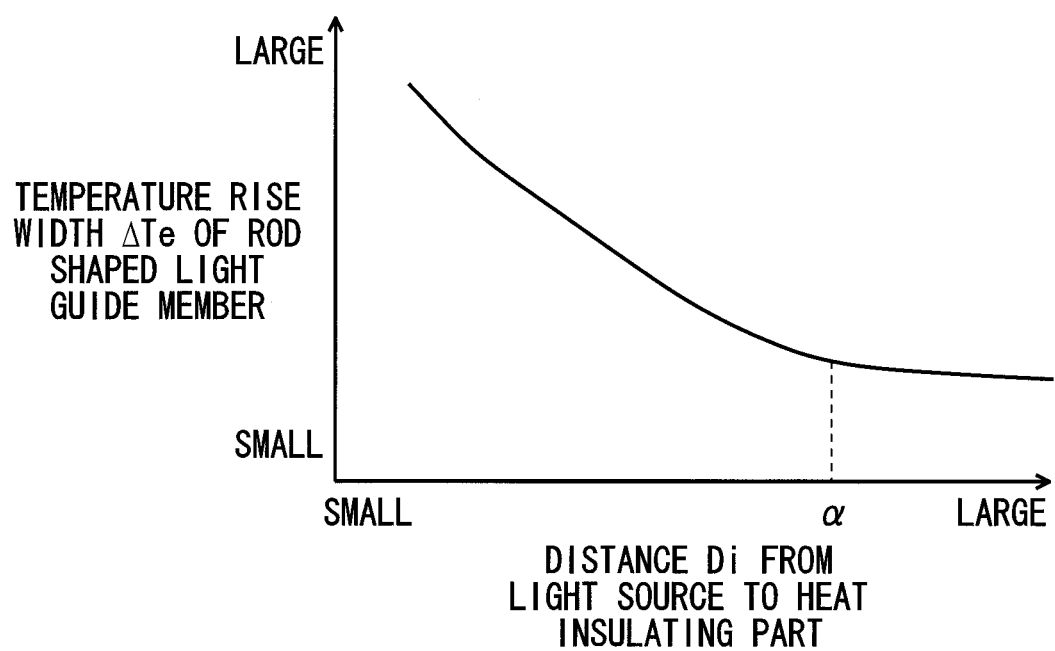
FIG. 2 is a characteristic view showing a relation between a distance from a light source to a heat insulating part and a temperature rise width of a rod shaped light guide member.

FIG. 2 shows a relation between a distance Di from the light source 13 to the heat insulating part 18 and a temperature rise width ΔTe of the rod shaped light guide member 11. When the distance Di is a minimum value which can be taken by the distance, namely, when the heat insulating part 18 is located at a position which can be taken by the heat insulating part 18 where the heat insulating part 18 comes nearest to the light source 13, the adiabatic effect of the heat insulating part 18 is minimum and the temperature rise width ΔTe is maximum. Then, as the distance Di is larger, the adiabatic effect is more increased (the temperature rise width ΔTe is decreased). When the distance Di exceeds a certain value α, the adiabatic effect (the temperature rise width ΔTe) is hardly changed. On the other hand, as described above, as the rod shaped light guide member 11 is more distant from the light source 13, the light emission efficiency of the rod shaped light guide member 11 is more deteriorated. As the above-described distance Di is larger, the distance from the light source 13 to the rod shaped light guide member 11 is larger.

Accordingly, the position of the heat insulating part 18 is preferably determined by considering both the relation between the distance Di and the adiabatic effect (the temperature rise width ΔTe) shown in FIG. 2 and a relation between the distance from the light source 13 to the rod shaped light guide member 11 and the light emission efficiency of the rod shaped light guide member 11.

Figure 3:
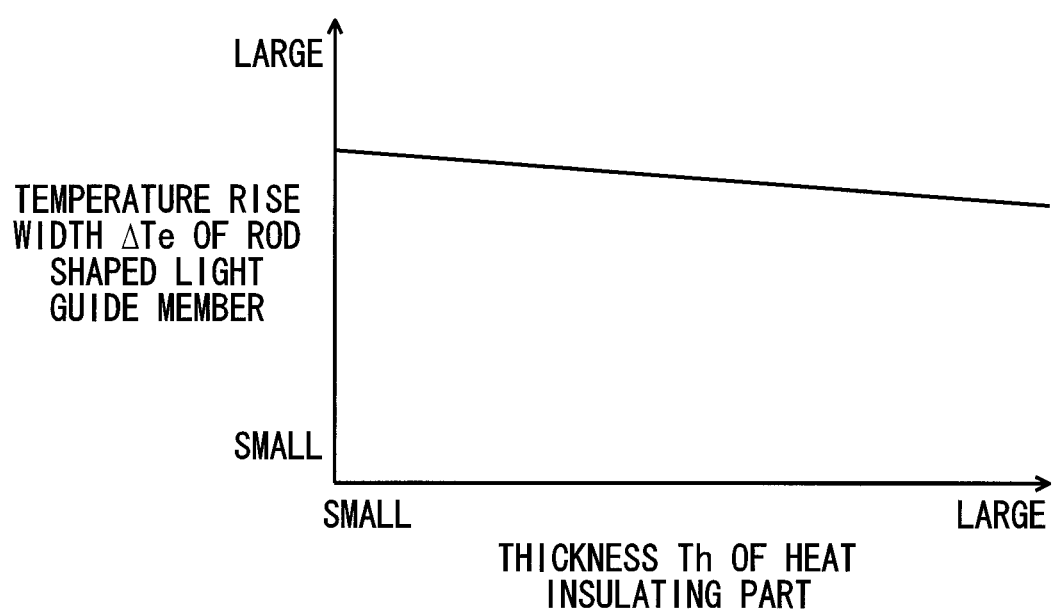
FIG. 3 is a characteristic view showing a relation between a thickness of the heat insulating part and the temperature rise width of the rod shaped light guide member.

FIG. 3 shows a relation between a thickness Th of the heat insulating part 18 and the temperature rise width ΔTe of the rod shaped light guide member 11. When the thickness Th is a minimum value which can be taken by the thickness, the adiabatic effect of the heat insulating part 18 is minimum and the temperature rise width ΔTe is maximum. Then, as the thickness Th is larger, the adiabatic effect is more increased (the temperature rise width ΔTe is decreased). On the other hand, as described above, as the rod shaped light guide member 11 is more distant from the light source 13, the light emission efficiency of the rod shaped light guide member 11 is more deteriorated. As the thickness Th is larger, the distance from the light source 13 to the rod shaped light guide member 11 is larger.

Accordingly, the thickness of the heat insulating part 18 is preferably determined by considering both the relation relative to the adiabatic effect (the temperature rise width ΔTe) shown in FIG. 3 and a relation between the distance from the light source 13 to the rod shaped light guide member 11 and the light emission efficiency of the rod shaped light guide member 11.

In the lighting device for a vehicle having a positioning part formed in the end part 11a of the rod shaped light guide member 11 by an injection molding, the holding part 17 may be omitted.

The heat insulating part 18 may be formed with a member separate from the holding part 17 (the guide case 15). In this case, a structure or an operation which attaches the heat insulating part 18 to the holding part 17 (the guide case 15) is separately necessary.

At least one of the rod shaped light guide member 11 and the heat insulating part 18 may be achromatic and transparent.

As the light source 13, the LED is representatively used as described in the above-described embodiment. However, a light source different from the LED may be used.

In order to illuminate parts respectively in the vehicle, for instance, a periphery of an instrument panel, a door panel, a console box or the like, the above-described lighting device 10 for a vehicle may be attached in the vicinities thereof.

Further, the lighting device 10 for a vehicle may be used as a courtesy lamp, a map lamp, a room lamp or the like.

Further, in order to illuminate outer parts of the vehicle, the lighting device 10 for a vehicle may be attached to positions different from positions described in the above-described exemplary embodiment.

What is claimed is:

1. A lighting device for a vehicle comprising:
   a transparent rod shaped light guide member having an incident surface of lights in an end face;
   a light source which is arranged so as to be opposed to the incident surface of the rod shaped light guide member, the light source generates heat at a temperature equal to or higher than a softening point of the rod shaped light guide member, lights emitted from the light source are incident on the rod shaped light guide member through the incident surface, and the rod shaped light guide member emits lights in a linear form; and
   a transparent heat insulating part arranged between the light source and the incident surface of the rod shaped light guide member.

2. The lighting device for a vehicle according to claim 1, wherein
   the heat insulating part is formed with a material having a softening point higher than that of the rod shaped light guide member.

3. The lighting device for a vehicle according to claim 1, wherein
   the heat insulating part is formed with the material having the softening point as a temperature or higher obtained by transmitting heat of the light source through an air.

4. The lighting device for a vehicle according to claim 1, further comprising:
   a holding part which holds an end part including the incident surface of the rod shaped light guide member in a positioned state, wherein the heat insulating part is provided integrally in the holding part.

5. The lighting device for a vehicle according to claim 1, wherein
   the rod shaped light guide member includes a plurality of members having a layer structure that the plurality of members are laminated in concentric circles.

6. The lighting device for a vehicle according to claim 1, wherein
   the rod shaped light guide member comprises a single member having no layer structure.

7. The lighting device for a vehicle according to claim 1, wherein
   the light source includes a semiconductor light source, the softening point of the rod shaped light guide member is about 100° C., and a junction temperature of the light source is more than 100° C.

8. The lighting device for a vehicle according to claim 1, further comprising:
   a guide case provided with a holding part, the holding part has a cylindrical form, the holding part holds an end part including the incident surface of the rod shaped light guide member,
   the heat insulating part, which is arranged between the light source and the incident surface of the rod shaped light guide member, is integral with the holding part of the guide case.

9. The lighting device for a vehicle according to claim 8, wherein the guide case and the heat insulating part are formed of a resin material which is transparent.

10. The lighting device for a vehicle according to claim 8, wherein the heat insulating part is a bottom of the cylindrical form of the guide case.

11. The light device for a vehicle according to claim 1, wherein the light source and the heat insulating part are positioned spaced apart and are separated by open space.

12. The light device for a vehicle according to claim 1, further comprising:
   a case,
   wherein the transparent rod shaped light guide member, the incident surface, the light source, and the transparent heat insulating part are all arranged within the case.

* * * * *